March 29, 1927.
A. P. KOEBCKE
1,622,727
VEHICULAR LEAF SPRING
Filed March 9, 1926
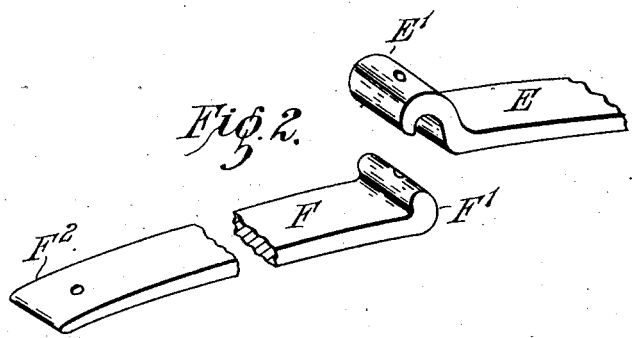
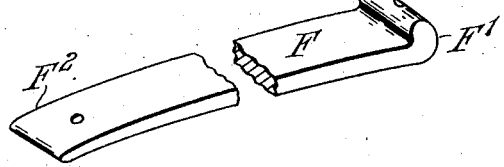
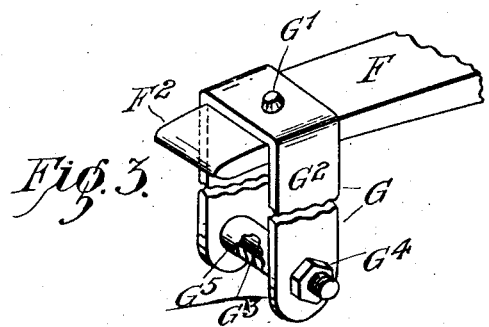
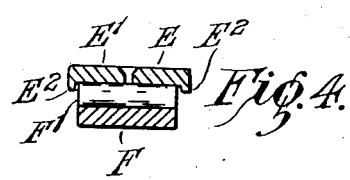
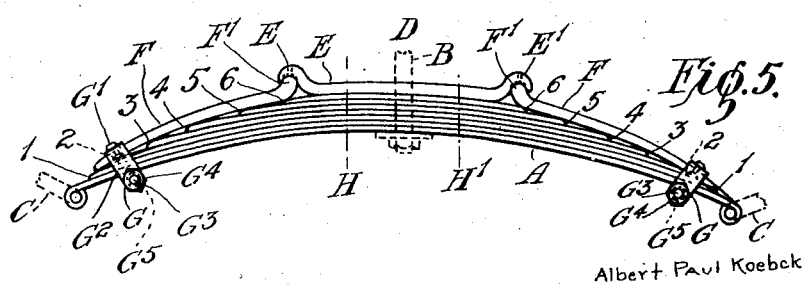
Albert Paul Koebcke
INVENTOR
By
ATTY.

Patented Mar. 29, 1927.

1,622,727

UNITED STATES PATENT OFFICE.

ALBERT PAUL KOEBCKE, OF MOUNT VIOLET, VICTORIA, AUSTRALIA.

VEHICULAR LEAF SPRING.

Application filed March 9, 1926. Serial No. 93,390.

My invention relates to vehicular (such as motor car) springs which consist of assembled stepped leaves of successively increasing lengths, and which are supported at and between their ends, in the case of springs of semi-elliptic type, but the invention is not limited to that type.

The principal object of my invention is to combine with ordinary leaf springs, means which will reduce rebound when road inequalities are met with during the progress of motor vehicles; but a further object is to provide shock absorbing attachments of simple form and small cost, adapted to be easily fitted to leaf springs of existing vehicles. My construction has parts which are interchangeable and replaceable readily if required. The use of my improvements protects springs against breaking strains, increases the comfort of passengers in motor vehicles, reduces vibration of mechanism of vehicles, and avoids damage to fragile or delicate goods in the vehicles. A further result is that mileage per fuel unit is increased.

I will describe the invention as applied to a semi-elliptic leaf spring, such as is usually connected at the middle, and at each end with parts of a vehicle, one side, for example the top, being convex and stepped, the longest leaf of the spring being at the under or concave side.

I attach a central member, which may be termed a saddle; a metal strap at each side thereof, which may be termed a stirrup bar; and at each outer end a spring holding clip, which may be termed a stirrup.

The saddle is fitted on the middle of the head of the spring, and extends towards the spring ends, as to above the ends of the upper leaf. The saddle is fixed to the spring as by making the king bolt (when there is one) extend through it as well as through the leaves, but there are many other devices known available for connecting purposes. My saddle is cambered usually to suit the spring curve, but a straight saddle could be employed, according to the leaf spring form.

There is at each end of the saddle a joint by which the head of a stirrup bar is located, so that the bar will swing as required during the use of the vehicle, the foot of each bar then rising and falling. A suitable joint is of knuckle form, the saddle for example having an end socket, and the stirrup bar having a boss entering the socket, and being restrained against lateral displacement.

The concave face of each stirrup bar normally is clear above the ends of a series of spring leaves owing to its adjustment and curve, but when the spring is relieved, as hereinafter indicated, the leaf ends come into contact with the concave face. The camber of spring leaves varies in practice, and the camber of my stirrup bars will therefore vary.

Stirrups hold the stirrup bars in adjustment so that when the vehicle is standing, whether loaded or not, there will be the said clear space above each step of the spring; and to secure this space the stirrup head is fixed as by a rivet to the stirrup bar foot which bears down on the spring near its end, the stirrup sides securely enclosing those spring leaves which are near the stirrup. The stirrup base is a roller supported by a bolt extending through the stirrup sides, and secured by a lock nut, that is to say the stirrup carries anti-friction means.

I do not find springy material essential in my attachment; rigid material is successful in practice, although a little springiness of the saddle is optional, to suit corresponding springiness at the middle of the spring convexity.

For lubrication purposes passage-ways are providable, into which lubricant can be supplied to work its way from each knuckle joint, for example, to the leaves of the spring. In practice some leaves of the existing semi-elliptic spring of a motor car would be discarded for convenience to better secure space for the saddle.

When shock occurs due to road inequalities, and a rebound follows, the body of the vehicle rises relatively to the ends of the semi-elliptic spring, which becomes more arcuate. Then some amount of oscillation may occur, limitation or prevention of which is secured by this invention. When the said arching occurs, the leaves rise more than do the stirrup bars, which swing on their pivots, and the ends of various leaves meet the stirrup bars, which resist further curvature of the spring as a whole, so that the shock becomes materially absorbed, and oscillation is reduced or prevented. Each leaf thus functions as in ordinary cars until resistance by the pivoted stirrup bars occurs, the bars swinging according to the violence of the shock.

During the spring movements the stirrups act as channels through which the spring ends slide, the rollers reducing friction.

When fitting my attachment to an existing vehicle the stirrup bolts would be withdrawn until the attachment had been set, then the bolts could be fixed by means of the nut.

After each shock the normal position of the parts is resumed.

In the drawings herewith a simple application of the invention is illustrated.

Figure 1 shows in side view a semi-elliptic spring fitted with my attachment, and under the tension which prevails when the whole is in position on a motor car or truck, for example.

Figure 2 is a perspective view of parts of a stirrup bar and part of a saddle to illustrate a joint.

Figure 3 shows the foot of a stirrup bar having a stirrup riveted to it; part of the anti-friction roller is broken away to show a supporting bolt.

Figure 4 shows in vertical section the saddle socket, and the stirrup bar head.

Figure 5 shows changes of position from the position in Figure 1, due to shock arising from a road inequality, the ends of the spring leaves being in contact with under surfaces of the stirrup bars.

In these drawings a semi-elliptic spring A, has any suitable support shown by a king bolt B, and any suitable steppings of leaves, shown at the ends 1, 2, 3, 4, 5, 6. C are means of connection to the vehicle, ordinarily shackles. The vehicle body is at D above the spring. In the drawing the shortest leaf of the spring is uppermost, the longest undermost, but obviously reverse positions are usable.

I add a saddle E having at each end a stirrup bar F, and at the foot of each stirrup bar a stirrup G. At each end of the saddle is a socket $E^1$ engaged by the head $F^1$ of a stirrup bar, and each foot $F^2$ of such bar bears upon a spring leaf near the spring end, as on step 1. The stirrup is fixed by rivet $G^1$ to bar F, and through its sides $G^2$ the bolt $G^3$ extends, carrying locking means shown by nut $G^4$, and carrying an anti-friction device shown by a roller $G^5$. Instead of the rivet other means of attachment can be readily employed obviously.

$E^2$ is a flange or lip at each side of socket $E^1$, so that the boss $F^1$ cannot become detached sideways, but the form of the provision in this respect is obviously variable.

The stirrup bar underside is concave, but allows the leaf ends to contact with its surface, the foot $F^2$ riding on its support and being curved at its end to reduce friction, a particular device used for that purpose being available. A position as in Figure 5 will exist momentarily from time to time, during travelling, the natural tendency of the leaf spring when relieved of load being to assume relatively to Figure 1 a more arched form, as in Figure 5. Lessening of load suddenly occurs intermittently during travelling by reason of road shocks.

Some semi-elliptic springs in use are divided, and the leaves have ends or crowns located at dotted lines H, $H^1$, with central means of connection, but reference to an elliptic spring in this specification is intended to cover such a form, or any equivalent.

What I claim is:—

1. A vehicular leaf spring attachment consisting of, in combination, a saddle to be mounted on the spring, a stirrup bar pivoted to the saddle, and extending along the spring outwards over steps formed by spring leaves, the bar foot bearing on the spring; and, fixed to the said bar, a stirrup which embraces the spring, but allows the latter to slide through it when the spring curvature changes.

2. A vehicular leaf spring attachment consisting of, in combination, a saddle to be mounted on the spring, stirrup bars, one at each end of the saddle, pivoted to it, and extending along the spring outwards over steps formed by spring leaves, each bar foot bearing on the spring; and, fixed to each stirrup bar, a stirrup which embraces the spring, but allows the latter to slide through it when the spring curvature changes.

3. A vehicular leaf spring attachment consisting of, in combination, a saddle to be mounted on the spring, a stirrup bar pivoted to the saddle, and extending along the spring outwards over steps formed by spring leaves, the bar foot bearing on the spring; and, fixed to the said bar, a stirrup which embraces the spring, but allows the latter to slide through it when the spring curvature changes, the pivot being of socket and boss type, with means to prevent lateral displacement.

4. A vehicular leaf spring attachment consisting of, in combination, a saddle to be mounted on the spring stirrup bars, one at each end of the saddle, pivoted to it, and extending along the spring outwards over steps formed by spring leaves, each bar foot bearing on the spring; and, fixed to each said bar, a stirrup which embraces the spring, but allows the latter to bear on and, when the spring curvature changes, slide through it, the stirrups having anti-friction devices to facilitate said sliding.

5. In combination with a leaf spring, a means for retaining a stirrup bar, a stirrup bar pivoted to the said retaining means, and extending over, but out of contact with steps formed by spring leaves, the bar foot bearing on the spring near its end, and means to hold the bar end in slidable relationship to the spring, the latter being adapted by altering its curvature, to make said steps press the stirrup bar, the latter being adapted to resist the said pressure.

6. In combination with a leaf spring of semi-elliptic type, a saddle having at each end means for retaining a stirrup bar, a stirrup bar pivoted to said retaining means, and extending over, but out of contact with steps formed by spring leaves, each bar foot bearing on a spring end, and means to hold the bar end in slidable relationship to the spring, the latter being adapted by altering its curvature, to make spring steps press a stirrup bar, the latter being adapted to resist said pressure.

7. The construction in claim 5, but with at the stirrup foot an anti-friction member on which the spring bears, and will slide.

In witness whereof I have hereunto set my hand.

ALBERT PAUL KOEBCKE.